United States Patent [19]
Hardigg et al.

[11] Patent Number: 5,736,221
[45] Date of Patent: Apr. 7, 1998

[54] WELDED PLASTIC PANELS AND METHOD OF MAKING SAME

[75] Inventors: James S. Hardigg, Conway, Mass.; Robert L. Wells, Thetford Center, Vt.; Mark C. Gaydos, Greenfield, Mass.

[73] Assignee: Hardigg Industries, Inc., South Deerfield, Mass.

[21] Appl. No.: 505,403

[22] Filed: Jul. 21, 1995

[51] Int. Cl.$^6$ .................................................. B32B 3/12
[52] U.S. Cl. ...................... 428/116; 428/119; 428/542.2
[58] Field of Search ........................... 428/116, 118, 428/120, 119, 542.2

[56] References Cited

U.S. PATENT DOCUMENTS

| | | | |
|---|---|---|---|
| 2,715,598 | 8/1955 | Rees et al. | 428/166 |
| 3,096,958 | 7/1963 | Koontz | 244/123 |
| 3,509,005 | 4/1970 | Hartig | 428/116 X |
| 3,664,906 | 5/1972 | Hartig | 428/116 |
| 3,748,214 | 7/1973 | Withers | 428/166 |
| 4,740,408 | 4/1988 | Mochida et al. | 428/116 |
| 4,957,788 | 9/1990 | Colonel et al. | 428/120 X |
| 5,089,206 | 2/1992 | Kia | 264/255 |
| 5,273,806 | 12/1993 | Lockshaw et al. | 428/120 X |

FOREIGN PATENT DOCUMENTS 0 571 876 A1  12/1993  European Pat. Off. .

*Primary Examiner*—Henry F. Epstein
*Attorney, Agent, or Firm*—Fishman, Dionne, Cantor & Colburn

[57] ABSTRACT

An injection molded panel composed of two half-panels each comprising a skin having matching integral webs or ribs disposed perpendicular to said skin wherein said half-panels are bonded together along said webs or ribs.

21 Claims, 4 Drawing Sheets

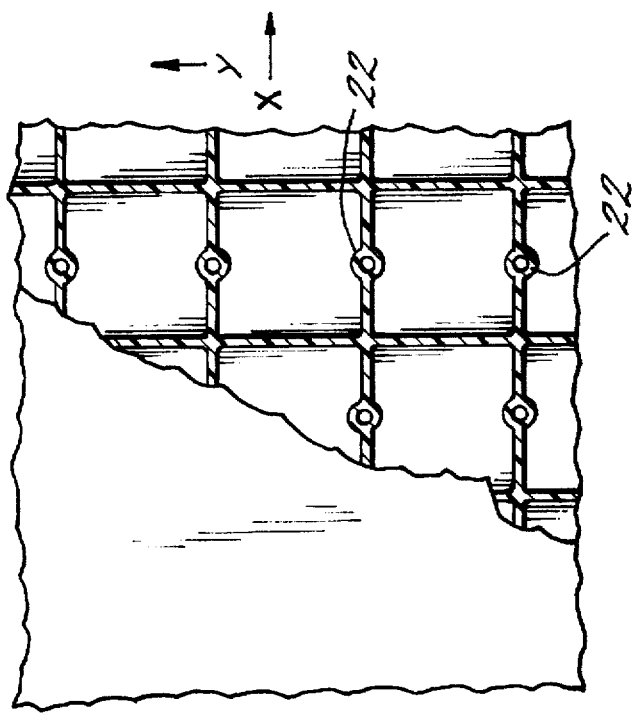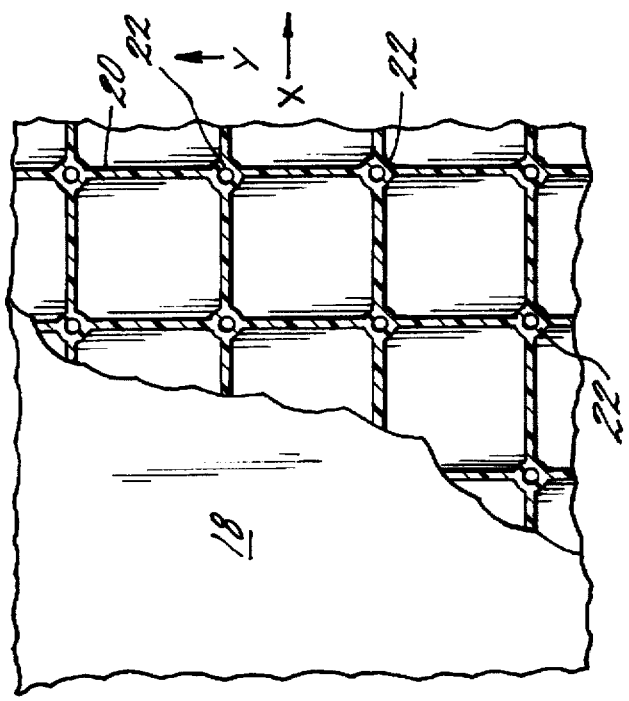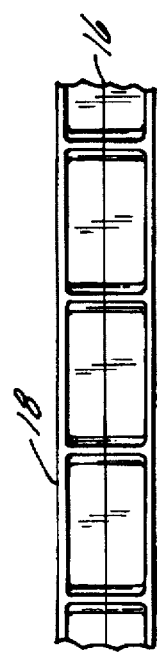

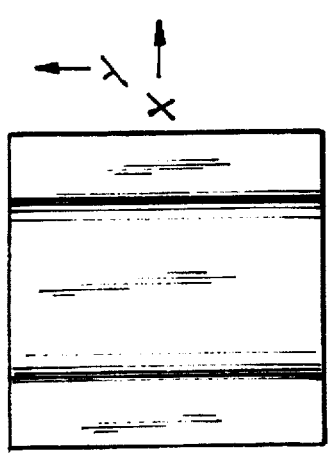
*FIG. 7*
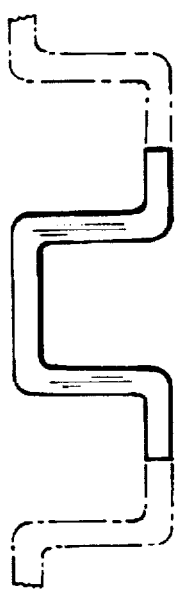
*FIG. 7A*
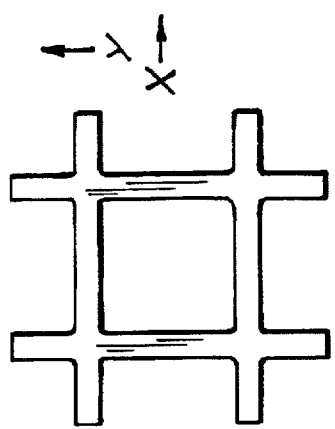
*FIG. 6*
*FIG. 6A*
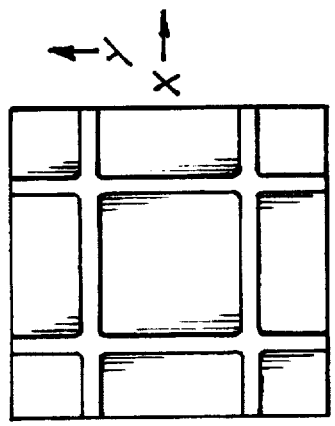
*FIG. 5*
*FIG. 5A*

5,736,221

WELDED PLASTIC PANELS AND METHOD OF MAKING SAME

BACKGROUND OF THE INVENTION

The present invention relates to injection molded thermoplastic panels and a method of making the same. In particular, this invention relates to a panel formed from two half-panels which are injection molded in a stack mold or more preferably by tandem-molding and thereafter, as soon as practicable, are (immediately is preferable) hot plate welded or otherwise bonded together.

Many products such as containers, vehicles, buildings, etc. utilize panels in their construction. Such panels, depending on the end use, are required to possess some of the following properties:

- bend, shear and compression strength in order to resist forces applied perpendicular to the plane of the panel;
- tensile, compression and shear strength and columnar buckling resistance in order to withstand forces applied parallel to the plane of the panel;
- stiffness;
- resistance to creep under long-term loading;
- impact resistance;
- ability to withstand temperature extremes and thermal shock;
- resistance to deterioration by moisture, chemicals, fungus, insects and ultraviolet radiation;
- capability for strong attachments;
- lightness of weight;
- fire resistance;
- thermal insulation;
- air and water tightness;
- buoyancy;
- smooth continuous or textured surfaces;
- capability of compound curvature; etc.

In much of the known panel construction, the requirements noted above have traditionally been filled by wooden boards. Wooden boards, however, are limited to providing bending and columnar strength in the direction of the grain of the wood. In an effort to overcome this limitation, plywood, in which the grain direction of each ply is at 90 degrees to its adjoining plies, creates a panel which has bending and columnar strength in all directions in the plane of the panel, although the properties are greater in the grain direction of the outer plies than in the cross grain direction of the outer plies.

Greater panel strength and uniformity of strength in all directions are obtained by laminating metal or plastic "skins" to a plywood core. To attain lighter weight, less dense cores are used such as balsa wood on end grain, honeycomb material, cellular plastics and truss structures of metal or plastic material. In these configurations, both the core of the lamination and its attachment to the skins need to have sufficient shear strength to allow the skins to resist with their full strength when the panel is subjected to bending or edgewise compression.

Another type of panel is known as the corrugated sheet. Said panels are efficient in providing bending strength and columnar strength in the direction of the corrugation, but exhibit very little of said strength in the crosswise direction.

Still another type of panel is comprised of a pair of parallel sheets of material, wherein each sheet has indented depressions which are welded to corresponding depressions on the other sheet of the panel. If the depressions are in the form of parallel corrugations, thereby creating a panel which is a row of connected parallel tubes, the panel will be efficient in providing bending strength in the direction of the corrugations, but not crosswise to them. If the depressions are conical or pyramidal in form and distributed over the faces of the panels, the bending strength developed will be low for the amount of material used. Moreover, to provide bending strength in all directions, indentations of various shapes and arrangements have been utilized. However, when the panel is subjected to bending, a complex stress pattern results in which some areas of the skins are more highly stressed than others, with a resulting loss of efficiency. This type of panel does not have uninterrupted flat surfaces which are desirable in many application.

SUMMARY OF THE INVENTION

The present invention is directed to a panel (preferably thermoplastic) that is comprised of two panel portions (preferably half-panels) that are bonded together. Each panel portion is comprised of a "skin" with integral webs. The webs may run in the same direction or they may be arranged in any pattern, e.g. honeycomb, triangles, squares, etc., that is advantageous in the use of the panel. In the simplest case, two half-panels, with matching webs facing each other, are brought together and bonded along the matching surfaces of the webs. The bonding may be made by any means that results in a joint having shear and tensile strength that is adequate to enable the panel to resist the forces that it must support.

It is an object of the present invention to provide a panel that has bending strength about all axes parallel to the plane of the panel and also about axes perpendicular to the plane of the panel.

It is another object of the present invention to provide a panel that has compression and tensile strength in all directions in its plane and also perpendicular to its plane.

It is a further object of the present invention to provide a method of making the panels of the present invention using tandem-molding techniques for forming said half-panels followed by hot plate welding or otherwise bonding of the half-panels together. Bonding of the half-panels is most preferably accomplished immediately after the forming thereof.

BRIEF DESCRIPTION OF THE DRAWINGS

The above and other objects and advantages of the present invention and comparisons with the prior art are considered in more detail with reference to the accompanying drawings in which:

FIG. 3 is a top plan view of a section of a panel having attachment bosses integrally molded into each half-panel at the junction of each web of said half-panel;

FIG. 3A is a section view taken along the line 3—3 of FIG. 3;

FIG. 4 is a top plan view of a section of a panel having attachment bosses integrally molded into the webs of each half-panel;

FIG. 4A is a section view taken along the line 4—4 of FIG. 4;

FIGS. 5, 6 and 7 are top plan views of injection molded panels of the prior art;

FIGS. 5A, 6A and 7A are elevation views of the panel elements shown in FIGS. 5, 6 and 7 respectively;

DESCRIPTION OF PREFERRED EMBODIMENTS

Figure 1:
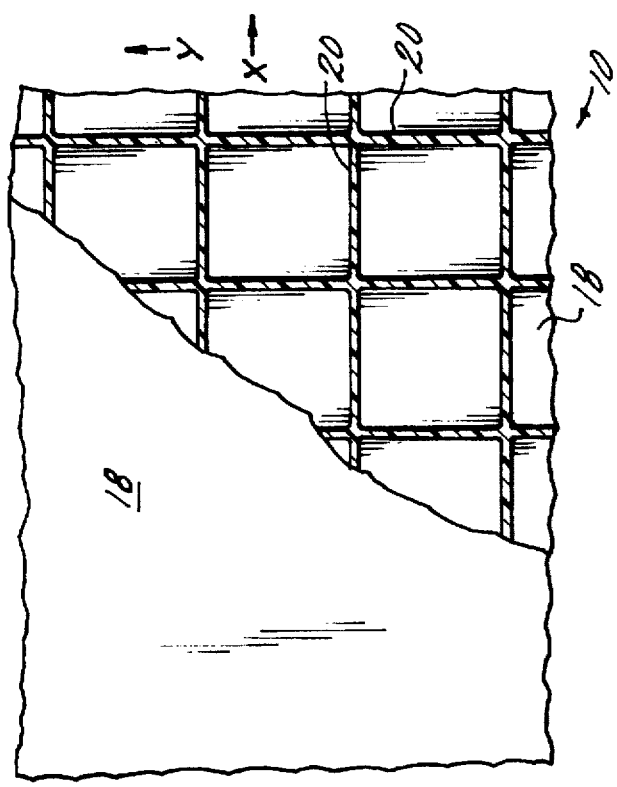
FIG. 1 is a top plan view of a section of a panel made in accordance with the present invention.
Figure 1A:
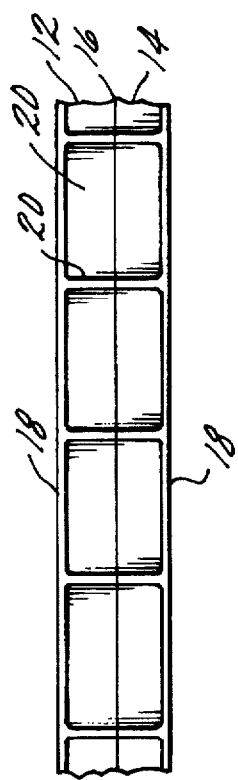
FIG. 1A is a section view taken along the line 1—1 of FIG. 1.

With reference to FIGS. 1 and 1A, the panel construction of the present invention is shown at 10. As depicted, the panel is made up of an upper half-panel 12 and a lower half-panel 14 which are bonded together at a mid-plane location 16 by known means such as welding or adhesives.

As shown in FIG. 1A, each half-panel 12 and 14 comprises an outer surface or skin 18 and a plurality of webs or ribs 20 disposed perpendicular to the inner surface of the skin 18 and molded integrally therewith. The half-panels 12 and 14 are joined together at a plane 16 disposed between the skins 18 via the webs 20.

With reference to the panel construction of FIG. 1, a panel strip 30 inches long, 2.5 inches wide and 1.0 inches overall thickness, having skins 0.10 inches thick and webs 0.10 inches thick running longitudinally and transversely on 2 inch centers, was computer-simulated using Ideas® finite element software provided by the Structural Dynamics Research Corporation. Said panel was supported at each end so as to provide a free span of 30 inches. A 50 pound load was applied over a 4 inch long area spanning the center and resulting panel stresses were calculated. The lower skin of the panel strip was in tension and displayed a peak value of about 1440 lb./in.$^2$ at the center of the panel. The upper skin was in compression with a peak value of about 1620 lb./in.$^2$ at the center of the panel. The shear stress in the web areas in the mid-plane of the panel was calculated to be less than about 144 lb./in.$^2$ As demonstrated, the highest stresses are in the panel skins and in the areas of the webs that are adjacent to the panel skins. Since the webs are integrally molded to the skins, the full strength of the material is available in these areas. As the weld areas of the panels are not highly stressed, the bending and columnar strength of the panels do not require the weld areas to be as strong as the parent material.

For panels made of thermoplastic materials, mid-plane welds or adhesive bonds can be made whose strength in tension, compression and shear approximates that of the parent material. Some of the joints obtained, however, are not as capable of flexure as the materials being bonded. The joints at the mid-plane of the panel shown in FIGS. 1 and 1A are chiefly loaded in shear. They are not subjected to flexure during bending or columnar compression of the panel. Also, the bonded areas, being at mid-plane, are protected from flexure during impacts on the outer surfaces of the panel. Only under a severe overload, such as an impact perpendicular to the face of the panel sufficient to buckle a web, would a joint area be subjected to flexure.

The mid-plane joint location of the panel of FIGS. 1 and 1A is advantageous over panel constructions in which skins are welded or adhered to a lightweight core. In those structures, the joined areas, being just under the skin, are susceptible to damage from external impacts which may cause delamination of the panel and failure of the structure.

For a panel of the present invention loaded as described above, to achieve its full potential bending strength, the skins on the upper side which are under compressive stress must not buckle before the compression yield strength is reached on that side or before the tensile yield strength is reached on the other side of the panel. To avoid buckling, the ratio of the web spacing to the skin thickness must not be too great. For example, in the case of a panel having equally-spaced ribs or webs running in the X and in the Y directions as shown in FIGS. 1 and 1A, the skin is divided into small squares and the stress in the skin at which buckling would start may be approximated by the following equation:

$$\sigma_{cr} = [8.6] \left[ \frac{E}{1-V^2} \right] \left[ \frac{h}{b} \right]^2$$

where $\sigma_{cr}$=internal stress at which buckling begins, lbs./in.$^2$

E=Young's Modulus for the skin material, lbs./in.$^2$

V=Poisson's ratio for the skin material h=thickness of skin, in.

b=length of the side of an elemental skin square, in.

For the panel construction shown in FIGS. 1 and 1A, made in high-density polyethylene having a value of E of 180,000 lb./in.$^2$, a yield strength of 3600 lb./in.$^2$ and where V=0.45, h=0.10 in and b=1.90 in., $\sigma_{cr}$ will equal 5400 lb./in.$^2$.

Since $\sigma_{cr}$ in this case considerably exceeds the yield strength of the material, when such a panel is subjected to bending, the compression side would not be expected to buckle and the tension side would be expected to resist up to the material's yield stress.

As shown in FIGS. 3, 3A, 4 and 4A, attachment bosses 22 may be provided in a regular pattern or almost any required pattern. In FIGS. 3 and 3A, said bosses 22 are located at the junction of each web 20 of each half-panel 12 and 14, while in FIGS. 4 and 4A, said bosses 22 are located in the webs 20 of each half-panel 12 and 14.

The bosses 22 which are integrally molded with the skin 18 and the webs 20 of each half-panel 12 and 14 may be cored for self-tapping or thread forming screws. As shown, the bosses 22 and each half-panel 12 and 14 may be in alignment and, therefore, bonded together concurrently with the webs. When an attachment is to be made, the skin 18 over one or more of the bosses 22 may be drilled through and attachment made by screwing and the like with or without the use of adhesive. Additionally, the bosses 22 may be provided with cored holes of a diameter suitable for receiving threaded inserts which are ultrasonically driven.

When bosses 22 are located at the junction of webs 20 as shown in FIG. 3, a tensile force applied perpendicular to the plane of the panel 10 at a boss 22 is transmitted by shear to the webs 20 which form, with the adjacent skins 18, a beam structure that resists the bending movements caused by the force. A force applied parallel to the plane of the panel 10 at a boss 22 is resisted by compression, shear and tensile forces in the skins 18 and the webs 20. While attachment bosses may also be located in the skins 18, but not the webs 20, of the panels 10, loads perpendicular to the plane of the panel applied to bosses in the skins cause local bending and displacement of the skin which is generally undesirable.

Figure 2:
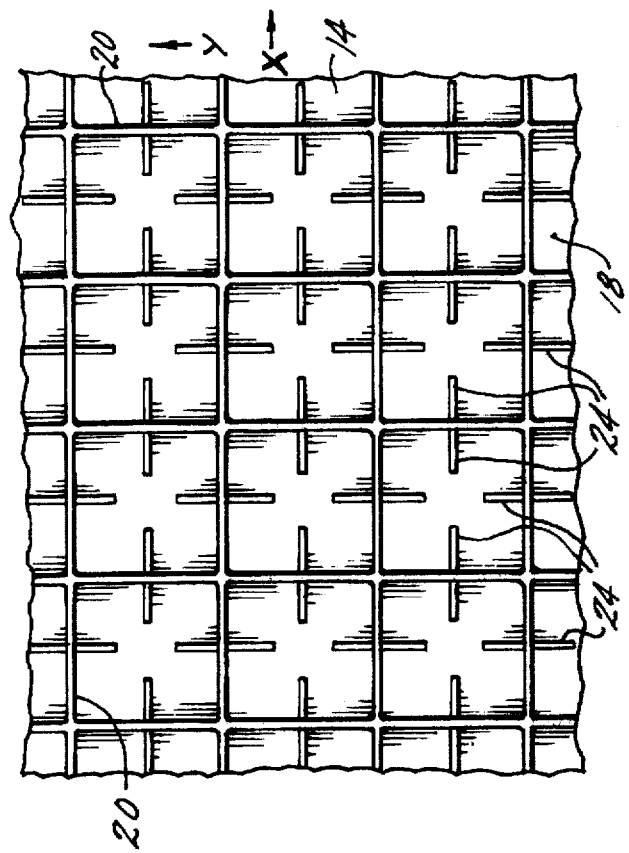
FIG. 2 is a top plan view of one of the half-panels which comprises the panel of FIG. 1.
Figure 2A:
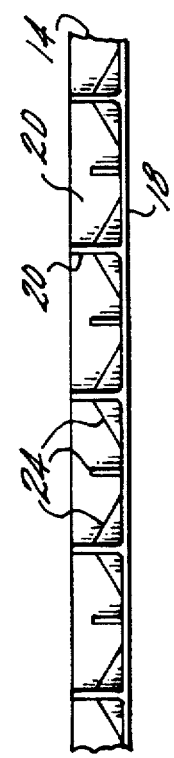
FIG. 2A is a section view taken along the line 2—2 of FIG. 2.

In order to avoid buckling of the panels of the present invention in long-span bending, the thickness of the webs or ribs 20 could be increased, their spacing could be reduced and/or the thickness of the skin could be increased. As an alternative to any such measures which significantly increase the amount of material used, it has been found that the addition of gussets to the panel-halves, such as shown by way of example at 24 in FIGS. 2 and 2A, is an efficient way to increase buckling resistance while adding little additional material. The gussets 24, which may be integrally molded with the panel-halves, are typically centered between the ribs 20, have a height of about ½ the height of said ribs 20 and a length of about ⅓ the distance between ribs 20.

Figure 9:
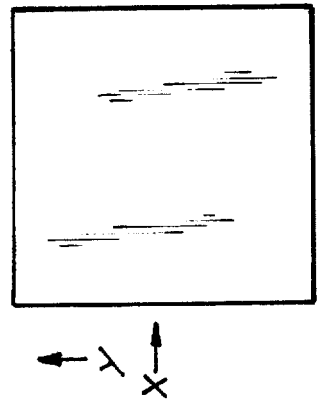
FIGS. 8 and 9 are top plan views of elements of extruded panels of the prior art.
Figure 8:
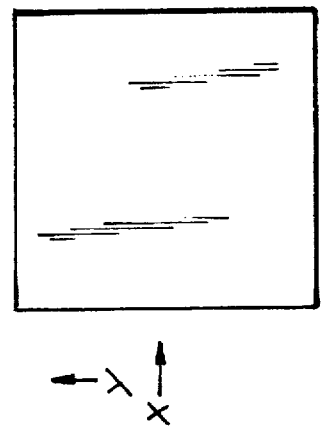

In order to demonstrate the overall superiority of panels made in accordance with the present invention, computer simulations of injection molded panels of FIGS. 5, 6, and 7 were compared to computer simulations of extruded panels of FIGS. 8 and 9, along with a solid flat plate of material having the same volume of material per unit area as the injection molded and extruded panels. Each of said formed panels had the same overall thickness and volume of material per unit of panel area.

For each of the panels noted above, the strength and deflection in bending, was calculated using the following equations:

(a) The strength of panels in bending is proportional to the Section Modulus, I/C, thus:

$$M = [\sigma] \left[ \frac{I}{c} \right] \quad \text{Equation (1)}$$

where

M=applied bending movement per inch of width, in.-lbs./in.

σ=allowable tensile or compressive stress, lbs./in.$^2$

I=Moment of Inertia of panel cross-section per unit width, in.$^4$/in.

c=distance from the neutral axis to the outer surface of panel, in.

As all of the panels are made from the same material, they will all have the same value of allowable stress, σ. Accordingly, Equation (1) above shows that the allowable bending movement is proportional to I/c.

The deflection of a panel under a bending load is inversely proportional to the Moment of Inertia of the cross-section, I, according to the equation.

$$f = [K] \left[ \frac{WL^3}{EI} \right] \quad \text{Equation (2)}$$

where f=deflection, in.

K=a coefficient determined by the location of the applied forces and the restraints W=total applied force per unit width, lbs./in.

L=length of span of panel, in.

E=Young's Modulus for the panel material, lbs./in.$^2$

I=Moment of Inertia of panel cross-section per unit width, in.$^4$/in.

The resistance to columnar buckling for each panel was calculated based on Euler's formula for long columns.

$$P_{cr} = \left[ \frac{\eta \pi^2 E}{L^2} \right] [I] \quad \text{Equation (3)}$$

where $P_{cr}$=compression force of buckling per inch of width, lbs./in.

η=coefficient appropriate to end condition of the column

E=Young's Modulus for the material in the columns, lbs./in.$^2$

L=length of column, in.

I=Moment of Inertia of column, in.$^4$/in.

The results of the calculations using Equations (1), (2) and (3) for various panels disclosed herein are given in Table I below:

TABLE I

Figure 10:
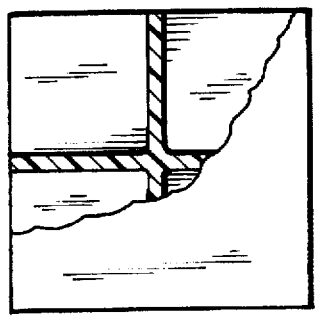
FIG. 10 is a top plan view of an element of a welded double-wall panel of the present invention.
Figure 10A:
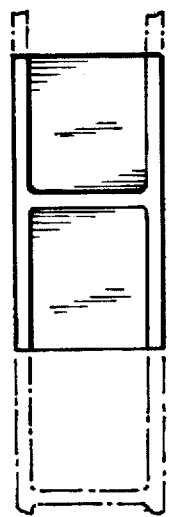
FIG. 10A is an elevation view of the panel shown in FIG. 10.
Figure 9A:
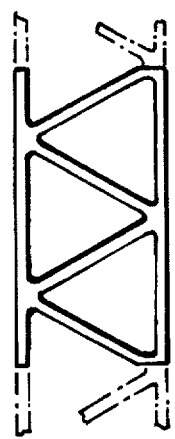
FIGS. 8A and 9A are elevation views of the panels shown in FIGS. 8 and 9 respectively.
Figure 8A:
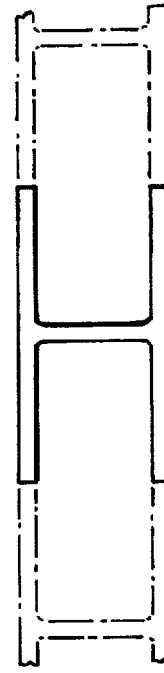

| | Y-DIRECTION | | X-DIRECTION | |
|---|---|---|---|---|
| | I/c in$^3$ per inch of width | I in$^4$ per inch of width | I/c in$^3$ per inch of width | I in$^4$ per inch of width |
| Solid flat plate | 0.013 | 0.0018 | 0.013 | 0.0018 |
| Single wall with ribs FIGS. 5 & 5A | 0.0265 | 0.019 | 0.0265 | 0.019 |
| Grid of bars FIGS. 6 & 6A | 0.025 | 0.013 | 0.025 | 0.013 |
| Corrugated panel FIGS. 7 & 7A | 0.082 | 0.042 | 0.0048 | 0.00040 |
| Extruded panel FIGS. 8 & 8A | 0.095 | 0.048 | 0.020 | 0.0087 |
| Extruded panel FIGS. 9 & 9A | 0.080 | 0.040 | 0.068 | 0.034 |
| Double-wall welded panel FIGS. 10 & 10A | 0.090 | 0.045 | 0.090 | 0.045 |

With reference to Table I, the single-wall panel with webs or ribs, FIG. 5, is about twice as strong in bending and ten times as stiff as the solid flat plate.

The panel comprised of a grid of bars, FIG. 6, is about the same in bending strength and stiffness as a single-wall panel with ribs, FIG. 5.

The corrugated panel, FIG. 7, is about three times as strong in bending and over twice as stiff in the Y-direction, parallel with the ribs, as a single-wall panel with ribs, FIG. 5. In the X-direction, however, the corrugated panel, FIG. 7, is about one-fifth as strong in bending and about one-forty-seventh as stiff as the single-wall panel with ribs, FIG. 5.

The extruded panel of FIG. 8 is about 3.5 times as strong and about 2.5 times as stiff in the Y-direction as the single-wall panel with ribs, FIG. 5. In the X-direction, it is about 0.75 times as strong in bending and about 0.5 times as stiff as the panel of FIG. 5.

As further shown, the extruded panel of FIG. 9 is about three times as strong in bending and about twice as stiff in the Y-direction as the single-wall panel with ribs, FIG. 5. in the X-direction, it is about 2.5 times as strong in bending and about 1.8 times as stiff as the single-wall panel with ribs, FIG. 5.

The double-wall welded panel of the present invention shown in FIG. 10 is about 3.4 times as strong in bending and about 2.3 times as stiff in both the X- and Y-directions as the panel in FIG. 5.

For panels of the same material and the same length in the direction of compression, Equation (3) shows that the force per unit width that can be resisted up to the buckling point is proportional to the Moment of Inertia, I. With reference to Table I, it will be seen that the columnar buckling strength of the molded and welded panel of FIG. 10 is substantially greater in the X-direction than that of the other panel forms listed. In the Y-direction, the columnar buckling resistance of the panel of FIG. 10 is greater than all of the others listed except that of the extruded panel of FIG. 8 which is about 6% higher.

The panels of the present invention, i.e. molded and welded half-panels, may be produced from a number of materials such as polyethylene, polypropylene, acrylonitrile-butadiene-styrene (ABS), polycarbonate, acrylic, etc. Such materials are used in a unique manufacturing process which combines three known technologies in a new and novel way. Hot plate weldable materials are the preferred materials.

The manufacture of the plastic panels of the present invention produce a number of problems which must be minimized in order to achieve maximum strength and stiffness in a panel structure. Said problems primarily stem from shrinkage of the half-panels during welding.

It is known that post-molding shrinkage of engineering plastics is on the order of 0.5%. For polyolefins, it is of the order on 1.0%. Said shrinkage is made up of three components:

(1) Thermal shrinkage;
(2) Phase change of the plastic transitioning from liquid to solid; and
(3) Molecular rearrangement.

While the first two areas of shrinkage happen simultaneously as a part cools, the third area, i.e. molecular rearrangement, may take hours to several days.

It is also known that shrinkage is a function of the following factors:

(1) Material makeup
(2) Processing temperatures/history
(3) Packing pressure and time
(4) In-mold cooling time
(5) Out-of-mold cooling condition
(6) Internal stresses due to (i) section thickness variations, (ii) plastic flow variations in the mold, and (iii) packing pressure in the mold.

In order to minimize the shrinkage problems noted above and produce panels as described in this disclosure, it has been found that it is preferable to mold two matching half-panels sequentially in an injection molding machine designed for "tandem molding". Tandem molding machines are different than standard injection molding machines in that they employ a center platen disposed between the normal stationary and moving platens. Two standard molds are mounted on each side of the center platen and, during operation, the two molds are opened alternatively for part removal. The injection unit is displaced towards the rear of the machine and injects each mold alternatively; then, the two molding cycles are offset. Tandem molding machines of the type described are available from Husky Injection Molding Systems, Ltd., Bolton, Ontario, Canada.

Another technique which may be used to reduce internal stress in the panel-halves and thus reduce asymmetric shrinkage and warpage involves gas-assist molding. Gas-assist molding realizes lower residual stress in the molded panels by greatly reducing the pressures required for packing and filling. In addition to reducing the stress, the pressures permitted by gas-assist reduce the machine tonnage required by a factor of 4. This yields a much more capital-efficient process than would otherwise be possible.

The panel-halves which are used to form the panels of the present invention may be produced by the tandem molding process noted above with or without gas-assist. In molding said panel-halves using the tandem molding process, the panel-halves are but one-half cycle different in age when joined together to form a full panel. As such is the case, shrinkage after molding and just prior to joining will be held to a minimum. Further, as each half-panel is molded, its length and width may be monitored and any necessary corrections to the molding parameters may be automatically made to achieve the desired dimensions in the oncoming half-panel.

Joining the parts, i.e. the half-panels, shortly after removal from the mold, using hot plate welding, allows the least possible time for differential shrinkage to occur and provides self-fixturing of the two parts during cooling to prevent warpage. Hot plate welding is the preferred method of bonding and creates immediate bonds due to its very short setting-up time and overall short-cycle time. The setting-up times (the time between when the parts first come into contact to when full strength is achieved) is typically between 10 and 20 seconds.

While other injection molding methods and apparatus, such as batch molding and stack molding, may be employed to form the panels of the present invention, said methods and apparatus create problems in shrinkage control and, thus, are more complex and costly.

While the present invention has been described in terms of specific embodiments, it should be understood that this is by way of illustration only and that the invention is not necessarily limited thereto. Some alternative embodiments and operating techniques will become apparent to those skilled in the art in view of the disclosure. Accordingly, modifications are contemplated which may be made without departing from the spirit and scope of the described invention.

What is claimed is:

1. A panel having two distinct panel portions said portions each comprising a skin and integrally molded supporting ribs extending generally perpendicularly to said skin from a first of two surfaces of said skin, said ribs defining a bonding surface spaced from said first surface of said skin by the extent of said ribs, said panel portions being bonded at the bonding surface of the ribs of each portion.

2. A panel as claimed in claim 1 wherein each rib is aligned with a rib on the other of said panel portion.

3. A panel as claimed in claim 1 wherein each rib panel portion further includes gussets.

4. A panel as claimed in claim 3 wherein said gussets are about half as tall as each rib, said rib being measured, from said first surface of said skin to said bonding surface of said rib and one third as long as each rib when measured in the same plane as the stated measurement from the first surface of the skin to the bonding surface of the rib and perpendicularly to said measurement from the first surface of the skin to the bonding surface of the rib.

5. A panel as claimed in claim 3 wherein said gussets include a hypotenuse extending from said rib to said first surface of said skin.

6. A panel as claimed in claim 3 wherein said gussets are located in a central location along each rib.

7. A panel as claimed in claim 1 wherein each said rib forms a geometric pattern on said first surface of said skin.

8. A panel as claimed in claim 7 wherein said geometric pattern is a repeating parallelogram shape.

9. A panel as claimed in claim 8 wherein said parallelogram shape is rectangular.

10. A panel as claimed in claim 1 wherein said ribs each include at least one boss molded therein for receiving a projection from or through the other of said panel portions.

11. A panel as claimed in claim 1 wherein said panel portions are bonded together by hot plate bonding.

12. A panel as claimed in claim 1 wherein said panel portions are bonded together by adhesive bonding.

13. A panel as claimed in claim 1 wherein said panel portions are bonded together by friction welding.

14. A panel as claimed in claim 4 wherein each gusset extends toward a center area of each rib defined geometric pattern.

15. The panel of claim 1 wherein each panel portion is comprised of a hot plate weldable material.

16. The panel of claim 1 wherein each said panel portion is composed of polyethylene.

17. The panel of claim 1 wherein each said panel portion is composed of polypropylene.

18. The panel of claim 1 wherein each said panel portion is composed of acrylonitrile-butadiene-styrene.

19. The panel of claim 1 wherein each said panel portion is composed of polycarbonate.

20. The panel of claim 1 wherein each said panel portion is composed of acrylic.

21. The panel of claim 1 wherein each said panel portion is composed of metal.

\* \* \* \* \*